United States Patent [19]

Fujita et al.

[11] Patent Number: 5,005,116
[45] Date of Patent: Apr. 2, 1991

[54] APPARATUS FOR DISPLAYING A PROFILE AND CORRESPONDING DATA OF OPERATING CONDITIONS

[75] Inventors: Shigeru Fujita; Hideo Tanaka; Susumu Harada, all of Numazu, Japan

[73] Assignee: Toshiba Kikai Kabushiki Kaisha, Tokyo, Japan

[21] Appl. No.: 267,254

[22] Filed: Nov. 4, 1988

[51] Int. Cl.$^5$ ............................................ G06F 15/46
[52] U.S. Cl. .................................. 364/188; 364/476; 425/170
[58] Field of Search ............... 364/188, 189, 191–193, 364/473, 476, 558; 340/706, 722, 753; 264/40.1, 40.5; 425/149, 150, 170, 171, 173

[56] References Cited

U.S. PATENT DOCUMENTS

| | | | |
|---|---|---|---|
| 4,189,765 | 2/1980 | Kotalik et al. | 364/188 |
| 4,396,977 | 8/1983 | Slater et al. | 364/188 |
| 4,418,381 | 11/1983 | Molusis et al. | 364/188 X |
| 4,674,053 | 6/1987 | Bannai et al. | 364/188 X |
| 4,745,543 | 5/1988 | Michener et al. | 364/188 |
| 4,823,254 | 4/1989 | Takada et al. | 364/188 |

Primary Examiner—Joseph Ruggiero
Attorney, Agent, or Firm—Cushman, Darby & Cushman

[57] ABSTRACT

In an input display apparatus including a display member adapted to display a plurality of set items, and a transparent panel including key elements and superposed on the display member, there are provided a profile controlled graphic display picture wherein such operating conditions as a speed, pressure and number of revolutions of a screw during one operation step of an injection molding machine are displayed in multi-stages in accordance with an operating position of the screw, and level changing means for changing the levels of the profile display picture in accordance with the magnitude of a changed value when an operating condition of the injection molding machine is changed. According to a modification, the display surface of the display member is divided into upper and lower sections. The upper section is provided with the function of an increment key and the lower section is provided with the function of a decrement key.

4 Claims, 6 Drawing Sheets

APPARATUS FOR DISPLAYING A PROFILE AND CORRESPONDING DATA OF OPERATING CONDITIONS

BACKGROUND OF THE INVENTION

This invention relates to an input display apparatus comprising a display member of such display apparatus as a cathode ray tube (CRT) or the like and a transparent touch panel superposed on the display member and provided with touch key elements.

Although the input display apparatus of this invention can be used for other applications, since it is most suitable for an injection molding machine for molding products having a relatively large thickness and required to have precise dimensions and a small internal stress, such as optical lenses, the invention will be described as applied to such an injection molding machine.

A copending U.S. patent application Ser. No. 140,145, filed on Dec. 29, 1987, U.S. Pat. No. 4,855,095 discloses a method and apparatus for injection compression molding of the type described above.

The apparatus for operating an injection compression molding machine described in the U.S. patent application comprises a stationary metal mold, a movable metal mold, an oil pressure actuator for advancing the movable metal mold toward the stationary metal mold to form a mold cavity therebetween while leaving a predetermined compression clearance $\delta$ between the movable and stationary metal molds, a heating cylinder engaging the stationary metal mold, means for supplying a thermoplastic resin into the heating cylinder, a screw contained in the heating cylinder for injecting molten resin into the mold cavity, means for rotating the screw, means for reciprocating the screw in the heating cylinder, a screw position detector for detecting an axial position of the screw, a plurality of screw position setters respectively setting predetermined screw positions along which the screw is moved, a plurality of comparators respectively comparing output signals of the screw position setters with the output signal of the screw position detector, a plurality of mold clamping force setters connected to receive output signals of respective comparators, a transfer switch for selecting one of the output signals of the mold clamping force setters, and an electromagnetic transfer valve energized by an output signal of the transfer switch through a control device for actuating the oil pressure actuator. There is also provided a timer for setting the rotation time of the screw, that is the filling time of the molten resin.

The injection compression machine described above operates as follows. When the filling step is completed, the screw reaches the forward limit position. Then, the metal molds are opened by moving the movable metal mold to take out the molded product. After that, the metal molds are partially closed while leaving a predetermined compression clearance $\delta$ therebetween. For preparing the next filling step, the molten resin is stored in the heating cylinder in front of the screw by rotating the same. The screw is retracted by the cylinder while being rotated by the oil pressure motor. When the screw position detector detects a predetermined screw position, a signal is issued so that the electromagnetic transfer valve is moved to a position to block the pressurized oil discharged from the injection cylinder. Consequently, the screw continues to rotate at that predetermined position, whereby the molten resin is accumulated in the space in front of the screw for an interval set by the timer. After elapse of a time set by the timer, the electromagnetic transfer valve is brought to a position for advancing the screw by the injection cylinder so as to inject the molten resin accumulated in the space in front of the screw into the mold cavity under a high pressure. As the screw reaches a predetermined position, for example a position set by the screw position setter, and during the injection stroke, the mold clamping cylinder is actuated to clamp together the stationary and movable metal molds so as to decrease the clearance $\delta$. Consequently, the problem of insufficient quantity of the injected resin at each shot and the problem of creating internal stress can be solved.

Figure 5:
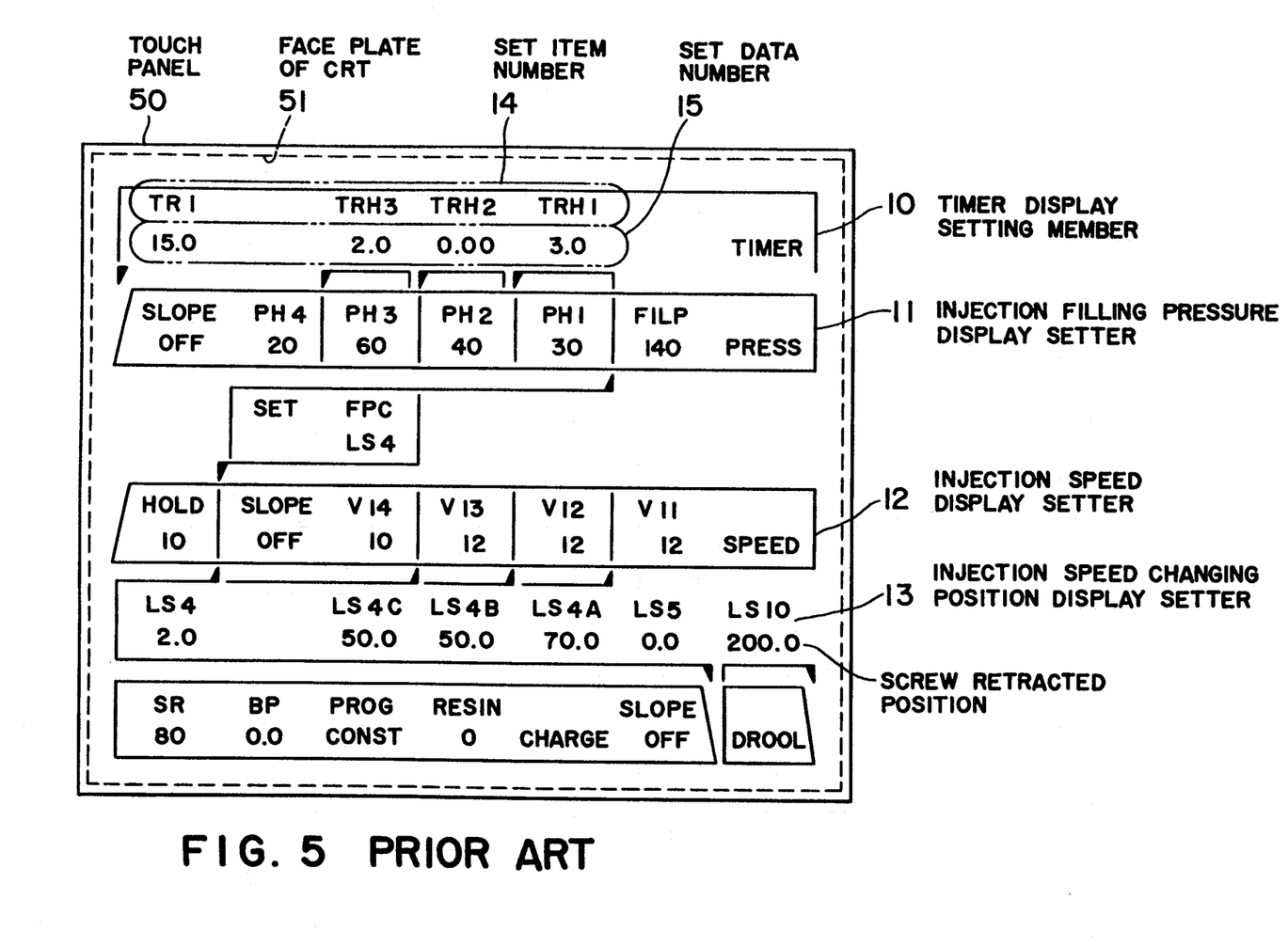
FIG. 5 is a plan view showing a prior art input display apparatus.
Figure 6:
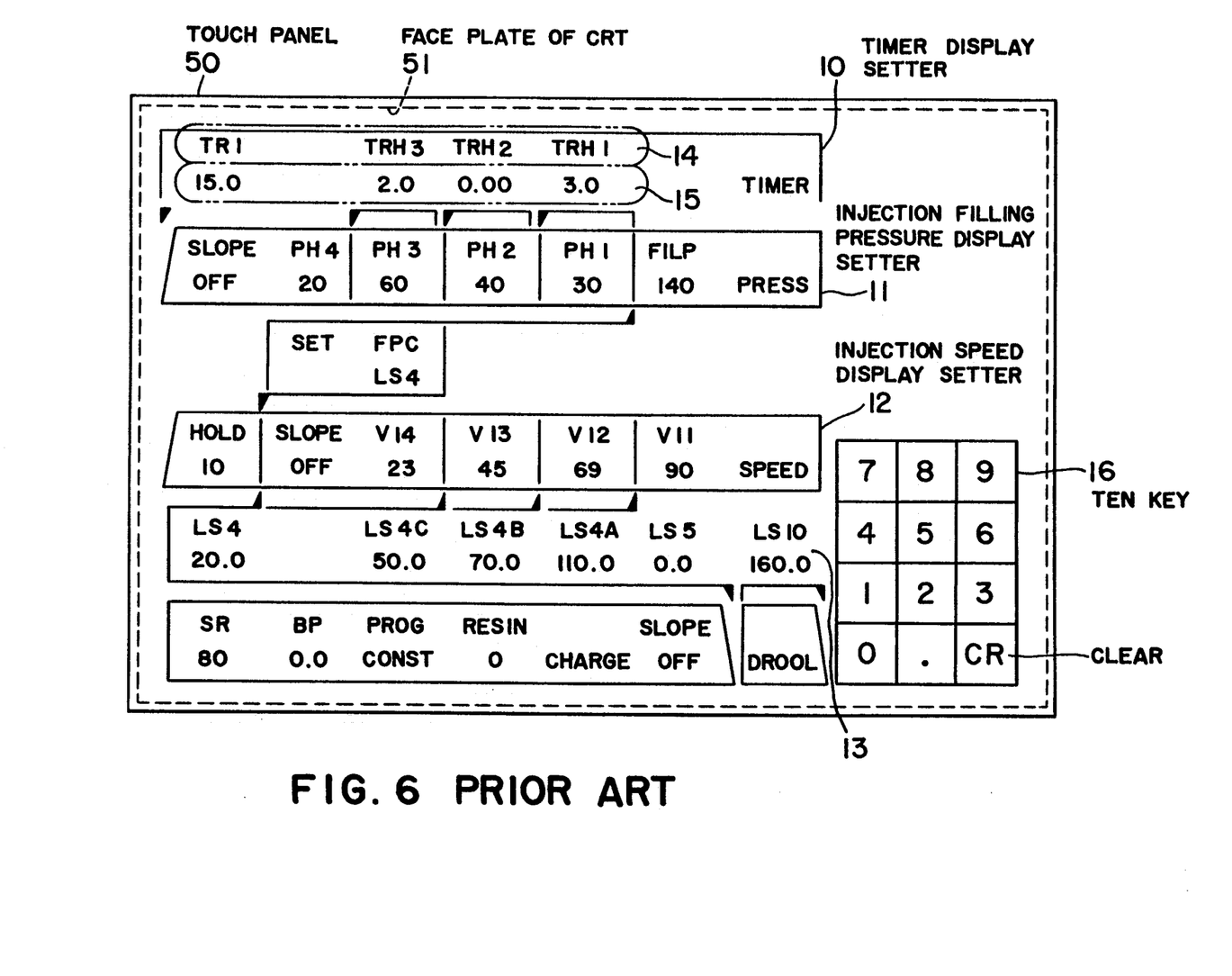
FIG. 6 is a plan view showing another prior art input display apparatus.

In an injection molding machine especially in an injection compression molding machine, it is advantageous to provide a transparent touch panel provided with a plurality of touch key elements and superposed on such a display member as a cathode ray tube. A prior art input display device utilizing touch keys shown in FIGS. 5 and 6 comprises a transparent touch panel 50 including a timer display setting member 10, an injection filling pressure display setter 11, an injection speed display setter 12, an injection speed changing position display setter 13, and other items. The touch panel 50 is superposed on the face plate 51 of a CRT. The timer display setting member 10 includes a plurality of pressure holding timers TR1, TRH3, TRH2 and TRH1 which are setting items 14 bounded by dot and dash lines, and a plurality of data display digits (in this case 15.0 sec., 2.0 sec., 0.00 sec. and 3.0 sec., respectively representing the times of the timers TR1, ... TRH1). In a block beneath blocks 14 and 15 are depicted a SLOPE of a holding pressure, pressures held PH4, PH3, PH2, PH1 and final pressure FILP and their values in percentages 20, 60 and 40 of their maximum values. The final pressure FILP is set as 140% because such high pressure is necessary to fill the resin into an intricated mold cavity. Arrows between the blocks show relations among timer times and corresponding pressures to be held. In the row of the injection speed display setters 12 are included pressure HOLD, SLOPE, positions V14, V13, V12 and V11 representing the positions at which the injection speed is changed and speeds in % of the maximum speed at respective positions. In the row beneath the row of the injection speed display setter 12 are shown screw position detection limit switches LS4, LS4C, LS4B, LS4A, LS5, LS10, and strokes 2.0–0.0 and 200.0 each in mm in which 200.0 shows the retracted position of the screw. In the last row are depicted the numbers of screw revolutions SR, screw back pressure BP, metering control condition program PROG, RESIN (raw material code), SLOPE, their values 80, etc., quantity of charge CHARGE, OFF and DROOL which occurs when the nozzle is slightly separated away from the stationary metal mold. It should be understood that these characters except numerical digits designate touch key elements including touch keys, push buttons, etc., and that when these touch keys are operated, items to be set are selected and the numerical data regarding selected items are inputted or changed by a ten key 16 shown in FIG. 6 in which the ten key 16 is contained in the touch panel, that is in the area of face plate 51 of the CRT. In this manner, by selectively operating a desired touch key, the result of the operation can be observed at a glance on the face plate.

Where a ten key on the outside of a CRT is used for effecting setting and changing of the injection speed, pressure, etc., the set data display member 15 and the input member are separated whereby the operativity would be decreased, whereas where the ten key is included in a portion of the transparent touch panel, only the area of the face plate excluding the ten key can be used as the data display area or portion. As a consequence, where it is desired to display all related data on the same face plate, the number of displayed data would be limited.

Where set data of a profile control are displayed by a graphic profile it is easy to sense an image with eyes, but when the graphic profile display is used in common with the set data there has been no method for correlating the display with the setting operation so that it has been impossible to efficiently utilize the effect of the graphic profile display. In an input system utilizing a ten key, even when a set value is changed slightly, all data must be newly inputted. For example, where it is desired to change a setting of 201.5 to 211.5, with a setter of a digital switch system, it is sufficient to change the value of the 10th order of magnitude from 0 to 1. But in an input system utilizing a ten key it is not sufficient to change a desired order of magnitude so that it is necessary to input again all orders of magnitudes resulting in a troublesome setting operation.

SUMMARY OF THE INVENTION

It is an object of this invention to provide a novel input display apparatus capable of making more clear and distinct the profile image by changing the level of a displayed picture in accordance with the magnitude of the profile control data.

Another object of this invention is to provide a novel input display apparatus capable of increasing operativity and rendering it easy to grasp the displayed picture image by using segment groups of the graphic display so as to correlate the graphic profile display and the setting operation of the data.

A further object of this invention is to provide a novel input display apparatus wherein a display surface, that is a display screen of a CRT is divided into two sections by horizontal and vertical lines, one of the sections being provided with an increment key function and the other section being provided with a decrement key function.

According to this invention there is provided an input display apparatus including a display member adapted to display a plurality of set items, and a transparent panel including key elements and superposed on the display member, characterized by comprising a profile controlled graphic profile display picture wherein such operating conditions as a speed, pressure and number of revolutions of a screw during one operation step of an injection molding machine are displayed in multi-stages in accordance with an operating position of the screw, and means for changing a level of the profile display picture in accordance with the magnitude of a changed value when an operating condition of the injection molding machine is changed.

DESCRIPTION OF THE PREFERRED EMBODIMENTS

Figure 1:
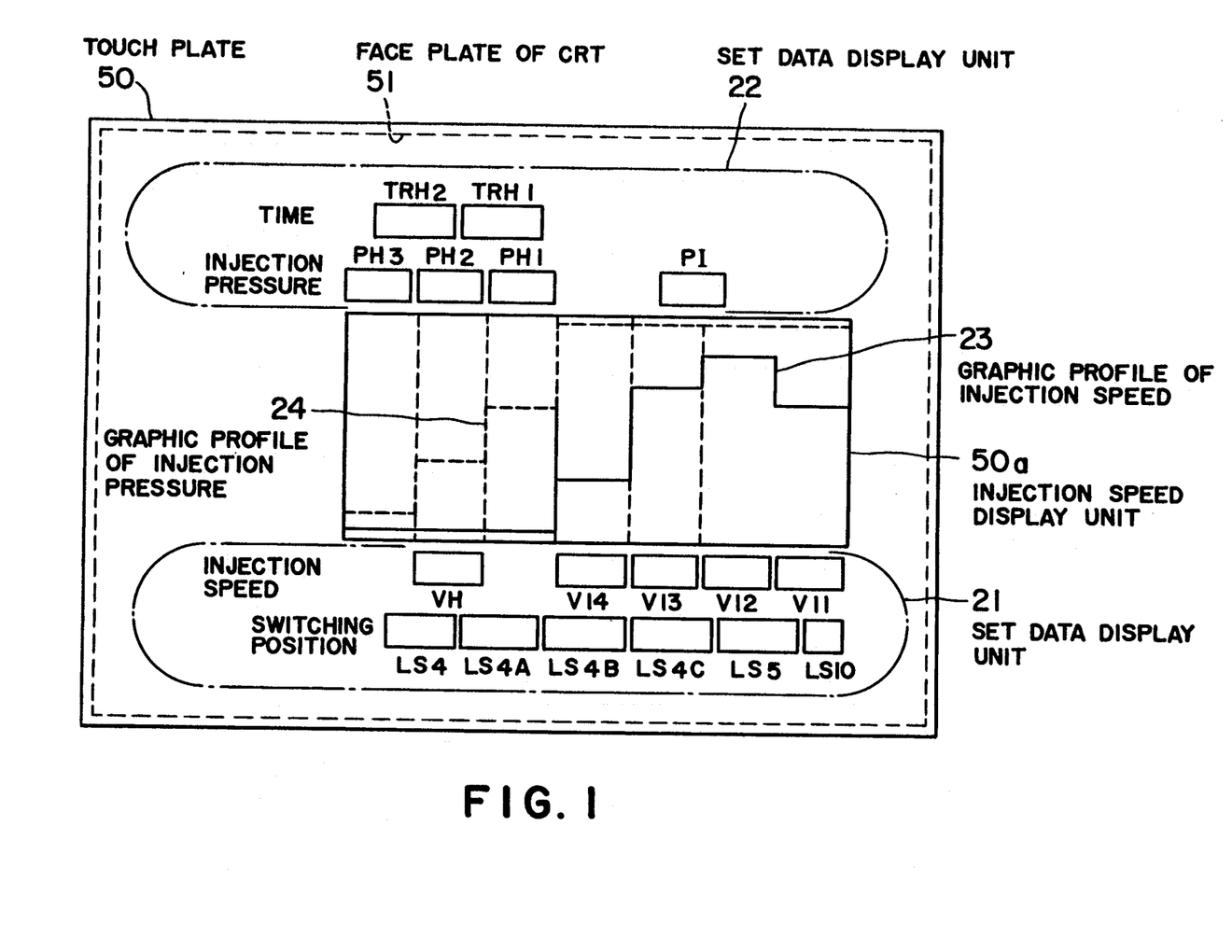
FIG. 1 is a plan view of the input data display apparatus embodying the invention and utilized for effecting normal display.
Figure 2:
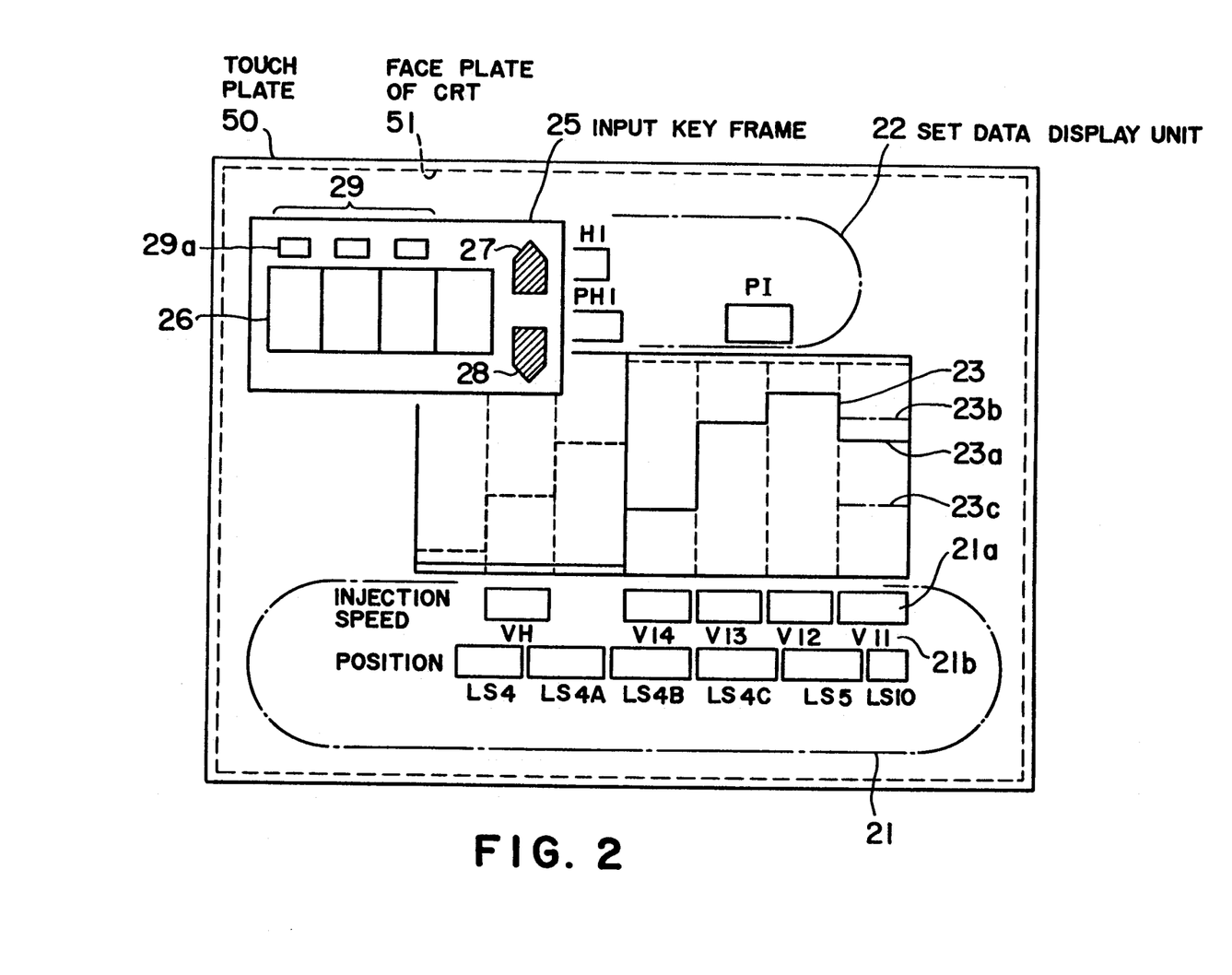
FIG. 2 is a plan view of the input data display apparatus according to this invention, which is utilized for displaying the data when they are inputted.

With reference to FIGS. 1 and 2, a case wherein the injection speed and the injection pressure utilized in the injection step of an injection molding machine are subjected to a multi-stage program control will be described. A block 21 bounded by dot and dash lines shows a set data display unit of a profile control member of the injection speed (this embodiment shows a four stage control). The upper row of this display unit shows the injection speed, whereas the lower row shows the switching position of the injection speed. A block 22 also bounded by dot and dash lines shows a set data display unit of an injection pressure profile control member. The upper row designates the operating time of the pressure, whereas the lower row designates the injection pressure (in this example, four stages are illustrated). A thick line graph 23 shows a graphic profile of the injection speed set in the injection speed display unit 50a, whereas a thick broken line graph 24 shows a graphic profile of the injection pressure, both graphic profiles 23 and 24 being used as selection elements of set items. For example, when a touch key corresponding to the first injection speed 23a is operated an input key frame 25 will be displayed at a position not related to the setting and display of the injection speed, as shown in FIG. 2. At the same time, the first injection speed 23a is selected for effecting a flash display, and the set data display unit 21a and set item 21b corresponding thereto are displayed by flashing, thereby enabling data input. The input key frame 25 includes a data display unit 26 for displaying data wanted to be set in the set data display unit 21a. Change of the data is performed by operating an increment key 27 or a decrement key 28. Thus, the data are inputted after changing them to necessary values. The data are inputted into memory means to be described later by operating again a portion now displaying a flickering data item or by selecting another item. At the same time, for the purpose of more distinctly displaying the image of the profile, the levels or heights of the displayed picture are changed in accordance with the size of the data as shown by dot and dash lines 23b and 23c as shown in FIG. 2.

Figure 7:
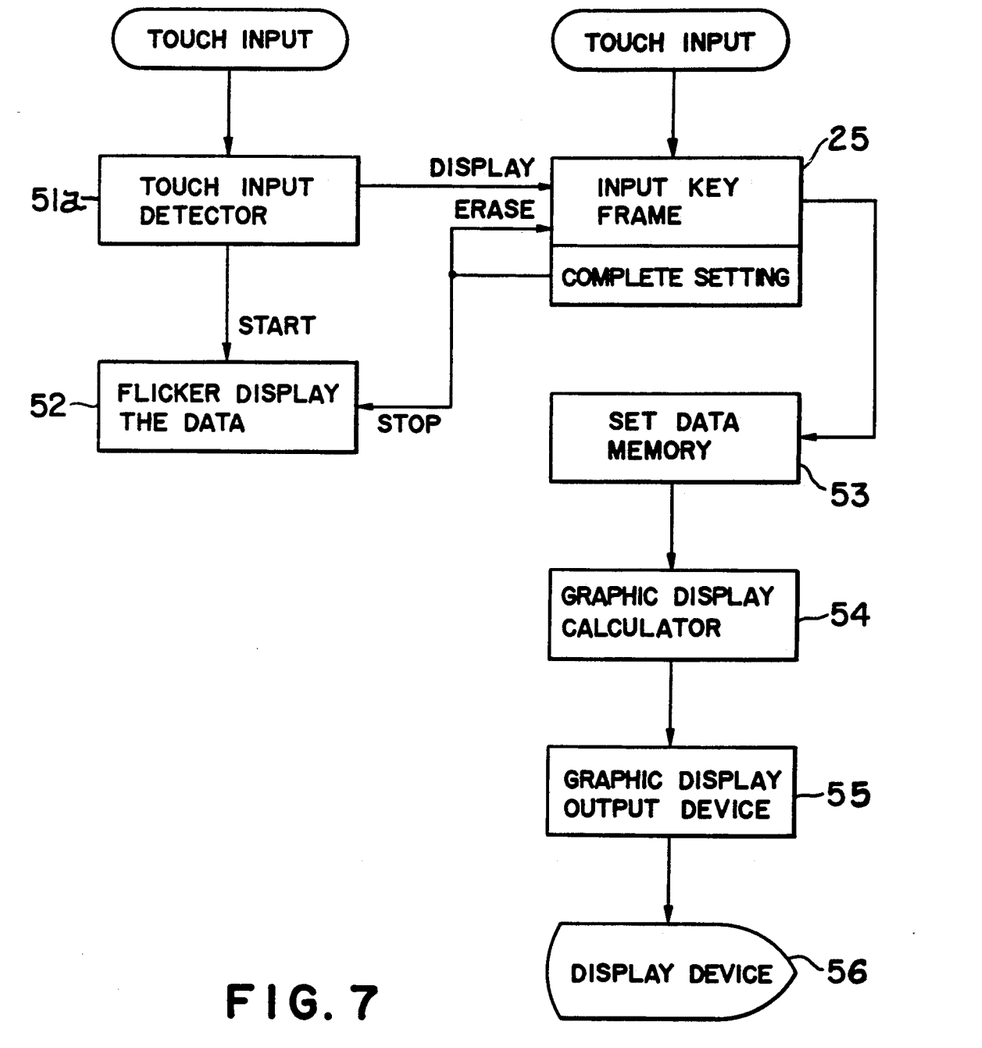
FIG. 7 is a block diagram useful to explain the steps of changing the level of a displayed graphic picture.

FIG. 7 is a flow chart showing the steps of changing the levels of the displayed graphic pictures. In FIG. 2, when display element 23 whose speed is desired to be changed is operated or touched, its operation is detected by a touch input detector 31a shown in FIG. 7 to judge the data portions, whereby data portions 21a, 21b and 23a shown in FIG. 2 are flicker displayed. At the same time, the input key frame 25 is displayed. When the data is changed by operating increment key 27 or decrement key 28 in the input key frame 25 the data in the set data memory device 53 is updated, and a graphic display calculator 54 calculates the graphic position of a new data. In this calculation logic, the scale is determined such that the maximum speed 120 mm/sec. would be 200 dots. At a speed of 72 mm/sec. the section 23a is displayed at a level or height of $x=200/120\times72=120$ dots. When the speed is changed to 70 mm/sec., the new position of the graph is calculated to be $x=200/120\times90=150$ dots, thus obtaining 23b. When the speed is changed to 42 mm/sec., a new graphic position can be obtained by assuming $x=200/120\times42=70$ dots. This result of calculation is outputted to a display device 56 through a graphic display output device 55.

As above described, according to this invention it is possible to provide a graphic display whose level can be changed in accordance with the set value.

Describing the invention shown in FIGS. 1 and 2 from another standpoint, when a touch key 21a corresponding to a first injection speed 23a V11 is operated, the upper half of the display screen of a CRT would have a function of an increment key while the lower half would have a function of a decrement key and the selected first injection speed 23a is displayed by flickering. The set data display unit 21a corresponding to this speed and the set item 21b are also displayed by flickering, thus enabling data input. These operations are stored in memory means by operating again a portion displaying flickering data item or by selecting different item. For the purpose of making more clear and distinct the levels of the displayed pictures, the selected first injection speed, for example, can be changed as shown by dotted lines 23b and 23c.

Change of the data can be made by operating the upper half having the function of an increment key and the lower half having the function of a decrement key.

According to this embodiment since the upper half of the display screen of a CRT has the function of an increment key, while the lower half has the function of a decrement key only when data are inputted, it is possible to improve the operativity and to obviate the limit on the notice of the displayed data at a glance.

When setting a new data, where the order of digit selection key in the input key frame 25 is used, it is possible to more quickly change the data. For example, after operating the order of digit selection key 29, when the increment key 27 is operated, the orders of first and 10th are not changed but only the data at the order higher than 100th are incremented. For saving the space occupied by the input key frame, the order of magnitude selection key 29 and data display unit 26 may be omitted, in which case items directly selected by the operation of the increment key 27 or the decrement key 28 can be displayed by the data display unit 21a.

Figure 3:
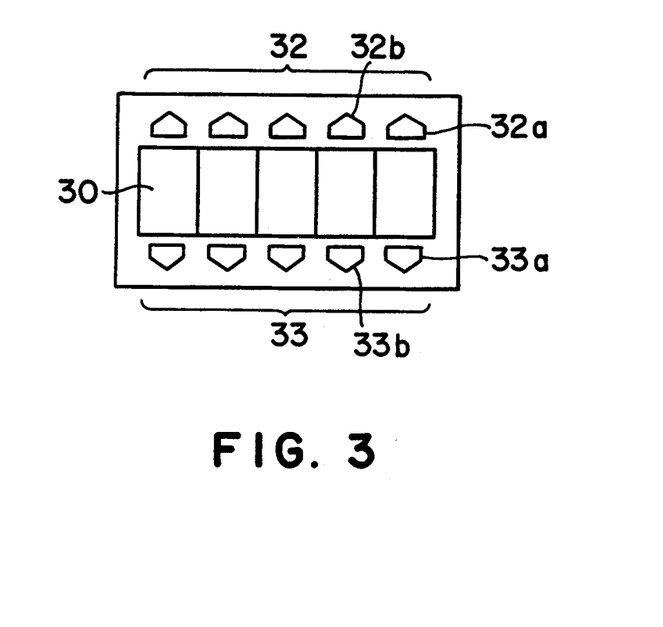
FIG. 3 is a plan view showing an input key frame utilized in the input data display apparatus of this invention.
Figure 4:
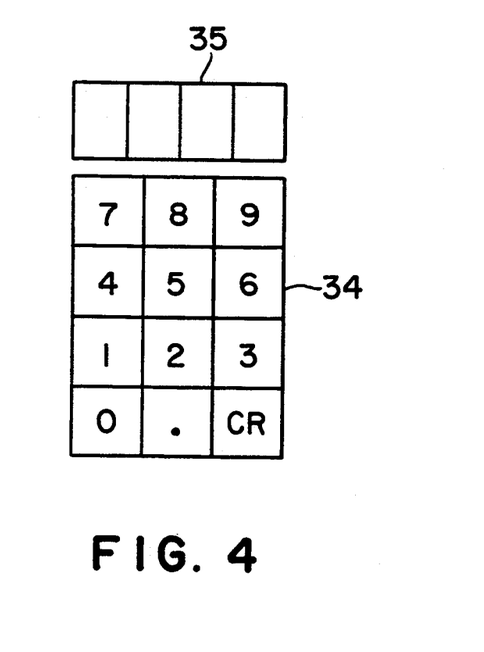
FIG. 4 is a plan view showing a modified input key frame.

The input key frame is not limited to that described above. An alternative input key frame shown in FIG. 3 can be used, wherein increment keys 32a, 32b, ... and decrement keys 33a, 33b, ... are provided for respective orders of digits of the data display unit 30 so that the setting of the data can be made by directly incrementing or decrementing an order of digit necessary for a value displayed on the data display unit 30. Alternatively, an input key frame as shown in FIG. 4 may be used, which comprises a ten key 34 and a display unit 35 adapted to display the input data of the ten key. Thus, various types of the input key frame can be used in view of the space or operating condition of the input key frame.

Although in FIGS. 1-6, as the display device was used a cathode ray tube, such other display devices as a plasma display device, an electro-luminescent display device, and a display screen utilizing liquid crytals can also be used.

According to this invention, since the level of the displayed picture is changed, in accordance with the magnitude of the profile control data, the displayed image of the profile becomes more clear and distinct.

What is claimed is:

1. An input display apparatus including:
a display member adapted to display a plurality of set items,
a transparent panel including key elements and being superposed on said display member,
a profile controlled graphic profile display picture displaying a profile and corresponding data representing an operating condition during one operation step of an injection molding machine in multi-stages in accordance with an operation position of a screw, and
means for changing a level of said profile display picture in accordance with a magnitude of a changed corresponding data value when an operating condition of said injection molding machine is changed, wherein an input key frame is displayed in a superposed relation on said displayed picture only when a set item is selected and operated for inputting a set value, said input key frame comprising a ten key and an input data display unit.

2. An input display apparatus including:
a display member adapted to display a plurality of set items,
a transparent panel including key elements and being superposed on said display member,
a profile controlled graphic profile display picture displaying a profile and corresponding data representing an operating condition during one operating step of an injection molding machine in multi-stages in accordance with an operating position of a screw, and
means for changing a level of said profile display picture in accordance with a magnitude of a changed corresponding data value when an operating condition of said injection molding machine is changed, wherein an input key frame is displayed in a superposed relation on said displayed picture only when a set item is selected and operated for inputting a set value, said input key frame comprising a data display unit having at least two orders of magnitudes and increment and decrement keys for respective orders of magnitudes.

3. An input display apparatus including:
a display member adapted to display a plurality of set items,
a transparent panel including key elements and being superposed on said display member,
a profile controlled graphic profile display picture displaying a profile and corresponding data representing an operating condition during one operation step of an injection molding machine in multi-stages in accordance with an operating position of a screw, and
means for changing a level of said profile display picture in accordance with a magnitude of a changed corresponding data value when an operating condition of said injection molding machine is changed, wherein an input key frame is displayed in a superposed relation on said displayed picture only when a set item is selected and operated for inputting a set value, said input key frame comprising an increment key, a decrement key and a data display unit of at least two orders of magnitudes.

4. The input display apparatus according to claim 3, wherein said input key frame comprises order of magnitude selection keys for all orders of magnitudes except the lowest order of magnitude of said data display unit and said pair of increment key and decrement key include an order of magnitude selected by said order of magnitude selection key, whereby inputting of the data to an upper order of magnitude is made possible.

* * * * *